3,233,336
APPARATUS FOR DRYING SOLID POLYMER
Morey E. Oldweiler, Whippany, and Michael A. Moore, Morristown, N.J., and William A. Brookshire, Baytown, Tex., assignors, by direct and mesne assignments, to Esso Research and Engineering Company, a corporation of Delaware
Original application Feb. 26, 1962, Ser. No. 175,558. Divided and this application May 20, 1964, Ser. No. 368,912
6 Claims. (Cl. 34—57)

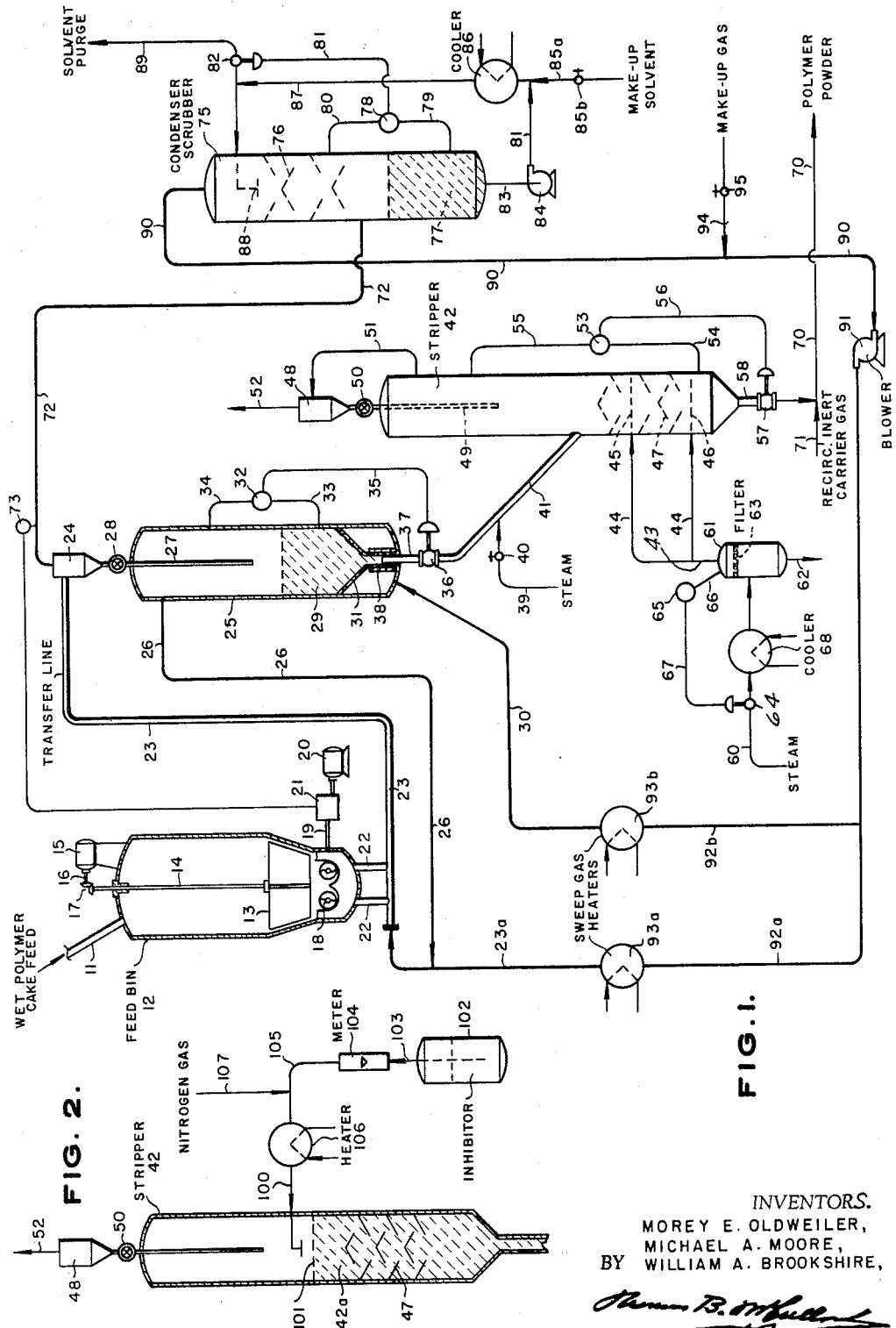

This application is a division of Serial No. 175,558, filed February 26, 1962, for Morey E. Oldweiler, Michael A. Moore, and William A. Brookshire, entitled "Processing of Solid Polymer."

The present invention is directed to a method for processing polymer. More particularly, the invention is concerned with removing nonaqueous solvent form solid polymer of an alpha olefin. In its more specific aspects, the invention is concerned with fluidized processing of wet nonaqueous, solvent-containing solid polymer of an alpha olefin having 2 to 8 carbon atoms in the molecule.

The present invention may be briefly described as a method of processing a wet nonaqueous, solvent-containing solid polymer of an alpha olefin in which the wet polymer is formed into a disperse phase suspension in a heated gasiform fluidizing medium at an inlet temperature sufficiently high to substantially volatilize the solvent without melting the polymer. Thus, the temperature of the fluidizing medium may be above the melting point of the polymer, but the wet bulb effect of the solvent vaporizing from the polymer protects the polymer from melting. The suspension is flowed through the first zone to remove a major amount of the solvent from the solid polymer and the solid polymer containing a reduced amount of solvent is separated from the suspension and formed into a first dense fluidized bed with a gasiform fluidizing medium at a temperature below the melting point of the polymer to reduce further the solvent content of the polymer. Thereafter, the polymer is formed into a second dense fluidized bed with a heated inert gasiform medium at an inlet temperature substantially the same or slightly higher (about 2° to 15° F., preferably about 2° to 10° F.) than the inlet temperature of the gasiform medium injected into the first dense bed to obtain a polymer substantially free of solvent which is recovered. Thus, the inlet temperature of the gasiform medium to the second dense bed is not less than the inlet temperature of the first dense bed, but is insufficiently high to melt the polymer.

The polymer which is processed in accordance with the present invention is a polymer of an alpha olefin having 2 to 8 carbon atoms in the molecule and may suitably be exemplified by polyethylene, polypropylene, ethylenepropylene copolymers, ethylene-butene-1 copolymers, ethylene-pentene-1 copolymers, and the like, having molecular weights in the range from about 10,000 to about 1,000,000. These polymers may be produced by polymerization of the corresponding olefins employing the Ziegler type polymerization catalyst which is obtained by at least partially reducing in solution in a diluent a halide of an amphoteric metal selected from Groups IVB, VB, VIB, and VIII of the Periodic System of Elements (see, for example, the Henry D. Hubbard Periodic Chart of the Elements, 1947 Ed. revised by W. F. Meegers; W. M. Welch Manufacturing Co., Chicago, Illinois). Examples of suitable halides from which the catalysts is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like. Other catalysts may be employed to polymerize the alpha olefins.

In preparing catalysts suitable for use in forming the polymer treated in accordance with the present invention, the amphoteric metal halide is reduced in solution in a nonreactive, nonpolar organic diluent in any suitable manner, such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and the at least partially reduced amphoteric metal halide, is employed as the medium in which olefin polymerization is effected.

The diluent to be employed should be a nonreactive, nonpolar organic medium in which the amphoteric metal halide starting material is soluble to an extent at least sufficient to provide an 0.1 weight percent solution of amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), which are preferred, halogenated aromatic hydrocarbons (monochlorobenzene, dichlorobenzene, etc.), gas oil distillate fractions obtained from the catalytic cracking of virgin gas oil feed stocks, diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about −60° F. to about 400° F., preferably at about room temperature. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

In processing the polymer of the alpha olefin having 2 to 8 carbon atoms, the polymer is recovered from a slurry as a cake containing an appreciable amount within the range from about 20 percent to about 55 percent by weight of solvent. This wet polymer containing the stated amount of solvent, which may be a mixture of an aromatic hydrocarbon such as xylene and an aliphatic alcohol such as methanol, must then be processed to remove the solvent. The solvent's presence is a result of a washing operation in separating means such as pan filters and centrifugal filters. Washing on the pan filters is designed to remove atactic polymer while the washing operation on the centrifugal filter is designed to remove trace quantities of metals such as catalyst residues as exemplified by, but not limited to, titanium and aluminum residues. Other metals may be present depending on the type of catalyst employed but when cocrystallized titanium trichloride-aluminum chloride is employed, the amount of catalyst residues is reduced by a washing action utilizing xylene and methanol. Thus, as a specific example, the alpha olefin polymer, such as polypropylene, as a wet cake may contain from about 20 percent to about 55 percent by weight of a mixture of 80 parts of methanol and 20 parts by weight of xylene.

The inlet temperatures of the gasiform medium employed in the disperse phase suspension of the present invention may range from about 230° F. to about 330° F. In the first dense bed, the inlet temperatures of the gasiform medium may range from about 160° F. to about 285° F., while the inlet temperatures of the gasiform medium in the second dense bed may range from about 170° F. to about 300° F.

Operating pressures in the transfer line conduit through which the disperse phase suspension is flowed may range from about atmospheric up to about 100 pounds per square inch gauge. A similar pressure may obtain in the first and second dense beds. It is preferred, however, to employ low pressures in the range from about 2 to about 6 pounds per square inch gauge in the transfer line conduit and a similar pressure in the first dense bed. Preferred pressures in the second dense bed may range from about 1 to about 5 pounds per square inch gauge.

The superficial gas velocity in the disperse phase suspension may range from about 5 to about 75 feet per second with a preferred range from about 20 to about 75 feet per second. The superficial gas velocity in the first and second dense beds may range from about 0.2 to about 2 feet per second with a preferred range in the first dense bed from about 0.8 to about 1.5 feet per second; whereas, in the second dense bed the superficial gas velocity will preferably range from about 0.4 to about 1.5 feet per second.

The present invention will be further illustrated by reference to the drawing in which:

FIG. 1 is a flow diagram of a preferred or best mode; and

FIG. 2 is a flow diagram of a modification of FIG. 1.

Referring now to the drawing, numeral 11 designates a charge line by way of which a wet polymer cake, such as the discharge from the centrifugal filter zone of a polypropylene operation, is fed into a feed bin 12, which is an elongated vertical vessel containing a horizontally rotatable leveling means 13 which is carried on a shaft 14, powered by a prime mover 15 through shaft 16 and gears 17. The horizontally rotatable leveling means is arranged above a plurality of screw conveyors 18 which are driven through shaft 19 by a prime mover 20 having a variable speed drive 21. Connected to screw conveyors 18 through discharge conduits 22 is a transfer line or conduit 23 which connects into a separation means 24 fluidly connecting into the top of a vertical elongated vessel 25. Hot gasiform fluidizing medium is introduced into conduit 23 by way of line 23a into which line 26 connects just ahead of the discharge conduits 22. The separation means 24, which is suitably a cyclone separator, is provided with a conduit 27 depending therefrom and terminating within the vessel 25. The conduit 27 is provided with a seal such as a star feeder 28 which allows solid polymer separated from the fluidizing medium in cyclone 24 to be discharged into the vessel 25 to form a dense bed 29. Heated gasiform fluidizing medium is introduced by line 30 into vessel 25 below an upwardly open conical foraminous grid 31 provided with a plurality of holes for discharge of the hot gasiform fluidizing medium upwardly into the dense bed 29. The dense bed 29 is maintained by level controller 32 connecting by conduits 33 and 34 into the lower and upper ends of the vessel 25 and connected by a line 35 to a suitable valve such as slide valve 36 arranged in the outlet conduit 37, which is a conduit connecting with the conical grid 31. It is to be noted that the outlet conduit 37 is provided with thermal insulation means 38 within the vessel 25. It is also to be noted that the cone forms an angle of about 35° to 50° with the horizontal axis of the vessel 25. An angle of 45° is preferred.

The outlet conduit 37 has a steam lead line 39 controlled by valve 40 for injection of steam into the outlet conduit 37 to assist in the discharge of polymer by line 41 into a second vertical elongated vessel 42. The vessel 42 is provided with a conduit 43 leading into a manifold 44, which discharges into spiders 45 and 46 in the lower section of the vessel 42. The spiders 45 and 46 are vertically spaced apart and are also vertically spaced between vertically spaced-apart baffle means 47. The lower section of the vessel 42 comprising the spaced-apart spiders 45 and 46 and the baffle means 47 comprise a plurality of stripping stages in the lower section of the vessel 42.

Connected to the upper section of the vessel 42 is a separation means 48, which discharges by a depending conduit 49 through a seal such as star feeder 50 into the vessel 42. The separation means 48, which is suitably a cyclone separator, is connected with the upper portion of the vessel 42 by a discharge conduit 51 which discharges gasiform fluidizing medium and entrained dried polymer into the cyclone 48. A conduit 52 discharges fluidizing medium from the cyclone 48.

A dense bed is formed in the plurality of stripping stages in the vessel 42, and the level of this dense bed is controlled by level controllers 53 connecting into the lower and upper portions of the vessel 42, respectively, by conduits 54 and 55 and connecting by conduit 56 to a diaphram valve 57 controlling flow from the outlet 58 of the vessel 42. The lower portion of the vessel 42 is in the form of a cone 59 for discharge of polymer through the outlet 58, controlled by valve 57. Steam is injected into the conduit 43 from a source not shown, by way of line 60 leading into a trap 61 from whence condensed water is discharged by line 62. The trap 61 may have a filter means 63 arranged therein to remove foreign bodies. The line 43 connects into the upper end of the trap 61. Line 60 is provided with a valve 64 which controls the flow of steam through a pressure controller 65 connected by lines 66 and 67 to the trap 61 and the valve 64. A temperature adjusting means such as a cooler 68 is also suitably arranged in the line 60 to adjust the temperature of the steam.

Polymer power is withdrawn through outlet 58 through valve 57 and is caused to flow through line 70 to a suitable storage bin or to a pelletizing device, as may be desired, by injecting an inert carrier gas into line 70 by way of line 71.

The fluidizing medium separated from the polymer in separation zone 24 is withdrawn therefrom by line 72. Line 72 is provided with a temperature sensing means 73, which connects by line 74 to the variable speed drive 21. The temperature sensing means 73 senses the temperature of the fluidizing medium discharging from separation zone 24 and causes a signal to be transmitted to the variable speed drive 21 and thereby controls the feeding of wet polymer by screw conveyors 18 and conduits 22 into transfer line or conduit 23. The temperature of the gas discharged into line 72 is determined by the dew point of the gas and the degree of solvent removal in line 23. Such temperatures may range from about 115° F. to about 180° F. Lower temperatures may be used if the dew point of the fluidizing medium introduced into line 23 is lowered.

Line 72 discharges into a condenser-scrubber means 75 provided in its upper section with vertically spaced-apart baffles or contacting means 76. In condenser-scrubber 75 a body 77 of condensed solvent is maintained and the level of this condensed solvent is regulated by level controller 78 connected by conduits 79 and 80, respectively, to the lower and upper sections of the vessel 75 and by means of conduit 81 to regulator valve 82 which controls the outlet flow of solvent.

The gasiform fluidizing medium in line 72 containing solvent removed from the polymer in transfer conduit 23 is countercurrently scrubbed with solvent recirculated from the body 77 by line 83, pump 84, line 85 containing a temperature adjusting means such as a cooler 86, and thence by line 87 through discharge 88 to a point above the baffle 76. Make-up solvent may be added to line 85 by branch line 85a, controlled by valve 85b. A purge line 89 in which valve 82 is arranged allows the discharge of excess solvent and maintains the level of the body 77.

Line 90 conducts the gasiform fluidizing medium substantially scrubbed of the solvent content to a blower 91 and thence by way of line 92 and branch lines 92a and 92b into heaters 93a and 93b where the inlet temperature of the recirculated fluidizing medium is raised to the proper point. Line 23a connects into heater 93a, and line 30 connects into the heater 93b.

It may be desirable to add an antioxidant and other inhibitors or stabilizers to the polymer which is recovered by way of line 70. This is conveniently accomplished by injecting a solution of the inhibitor, stabilizer, and/or antioxidant into the vessel 42. Thus, referring specifically to FIG. 2, a dense bed 42a having a level above the baffles 47 has a line 100 leading thereinto. Line 100 may discharge either above or below the level 101 of the dense bed 42a. In FIG. 2, line 100 discharges above the level 101. A source of additives such as inhibitors in an aromatic solution is provided in a vessel 102 from which a line 103 connected to a meter 104 leads by line 105 into a heater 106 to which line 100 connects. An inert gas such as nitrogen is introduced by line 107 into line 105 to carry the solution through the heater 106 and thence by line 100 into the vessel 42 where the solvent is removed and the additive intimately contacted and admixed with the polymer.

It will be seen from the description taken with the drawing that a new and simplified mode of removing solvent from polyolefins and the like has been provided. This mode and the apparatus by way of which the method is conducted has several important commercial advantages among which are: (1) high onstream service factor; (2) minimum investment; (3) high thermal efficiency, thus low operating costs; (4) low polymer holdup; and (5) no fouling surfaces; thus, no contamination of product from sloughing off of degraded material.

By way of explanation, heretofore polymer was dried in rotary driers to reduce the nonaqueous volatiles concentration. Experience has been that the drier tubes become badly fouled. The present invention eliminates the fouling of the conventional drier equipment.

In the transfer line or conduit with the screw conveyor leading thereinto, the wet polymer contacts hot gas which suitably is comprised of the vapors of the solvent and a hydrocarbon such as natural gas, including the components thereof such as methane, ethane and propane. Methane is a predominant constituent of natural gas and provision is made for introducing make-up gas into line 90 by line 94, controlled by valve 95. In any event, in the conduit 23 heat and mass transfer occur rapidly, and the gas is cooled from a temperature which may range from about 230° F. to about 330° F. down to about 115° F. to about 180° F., preferably about 140° F. to about 150° F., which results in a high thermal efficiency for the transfer line operation. Thus, the polymer is contacted rapidly and efficiently so that it never exceeds its melting point, the wet bulb effect of the vaporizing solvent protecting the polymer from melting. Thereafter, the polymer of reduced solvent content is recovered from the gas in a cyclone such as 24.

The first fluid bed receives the polymer of reduced solvent content from the first cyclone, and the polymer is contacted in the first fluid bed with the heated sweep gas. Here the polymer is heated further to lower the volatile content to a minimum and again partially cooling the gases which escape into the upper portion of the vessel containing the fluid bed and forming a second disperse phase which is introduced into the first disperse phase ahead of and slightly downstream from the entering fluidizing gas. In this way, full advantage is taken of the sweep gas to the first fluid bed to remove further amounts of the volatile matter. The product from the first fluid dense bed is transported to a second dense bed, where it is contacted with an inert gas such as steam, although other inert gases such as nitrogen, methane, and the like may be used. The second fluid bed is contacted in a staged vessel having a plurality of stages with about 2 to 4 actual stages. The temperature in the second dense bed is ordinarily maintained above the dew point of steam if steam is used as the gasiform fluidizing medium.

In order to illustrate further the present invention, wet polypropylene containing from about 28 percent to 52 percent of a mixture of methanol and xylenes is fed into a fed bin such as 12 and is then discharged into a transfer line such as 23 through screw conveyors, such as 18, with bridging prevented in the bin 12 by horizontally rotating leveling means, such as 13.

The wet polymer is fed at a controlled rate into the transfer line 23 by a variable speed screw conveyor controlled by a temperature controller such as has been described in connection with the drawing, which permits the outlet temperature of the transfer line to be controlled within ±2° F. This control means is quite advantageous, insuring uniform removal of solvent, steady feed rate, and high heat utilization. Smooth and nonfouling operation has been obtained in a transfer line with polymer holdup time varying from about 0.4 to about 1.2 seconds. A preferred holdup time varies from about 0.5 to about 1.0 second. Most of the methanol is removed by vaporization in the first 0.1 second, as evidenced by rapid temperature drop of the hot gas after contacting the wet polymer. Thus, the gas introduced by line 23a may be about 320° F., while the gas introduced by line 26 may be about 230° F. with the gas discharged into line 72 being about 140° F. The volatile content of the polymer is reduced from about 20 percent to about 55 percent by weight of the wet polymer down to about 2 percent to about 15 percent by weight, leaving the equivalent of transfer line 23. Actually, in this operation the volatile content may be from about 5 to 13 weight percent. With the dense bed 29 at about 230° F. with a residence time of about 10 minutes, the polymer volatile content introduced into vessel 42 is about 0.5 percent or within the range from about 0.05 percent to about 1.5 percent by weight. The dense bed in vessel 42 is at a temperature of about 240° F., and the residence time is about 12 minutes with the polymer product discharged by line 70 containing less than 100 p.p.m. of solvent, usually less than 50 p.p.m. The steam used as an inert fluidizing medium in vessel 42 may be at an inlet temperature of about 290° F., although other temperatures may be used.

In an operation wherein a foraminous grid such as 31 is employed, a perforated conical grid sloping at 45° to the center has given satisfactory operations at 275° F. gas inlet temperatures. There is no tendency for the polymer to circulate through the ⅛-inch holes in the conical grid during operation, and the polymer is discharged through the outlet 37 without difficulty.

In an operation such as described with respect to FIG. 1, dense bed levels such as in vessels 25 and 42 have been easily maintained by level controllers such as have been described.

Operating data show that the polymer such as introduced by line 41 containing 0.5 weight percent of solvent may be reduced to 50 p.p.m. of solvent in a vessel such as 42 wherein less than 15 minutes holdup is required. This may be compared with steam-heated rotary driers which ordinarily require two hours holdup to reduce volatile content to these levels. Holdup time in the first disperse phase and first dense bed is about 10 minutes as compared to the usual 30 minutes required by the conventional first stage rotary operation.

It will be seen from the foregoing description taken with the drawing that a new and improved process has been provided for handling wet solid polymer of an alpha olefin. It has also been shown that numerous adventional first stage rotary operation.

The nature and objects of the present invention having been completely described and illustrated and the best mode thereof set forth, what we wish to claim as new and useful and secure by Letters Patent is:

1. Apparatus for processing a wet, nonaqueous solvent-containing solid polymer of an alpha olefin having 2 to 8 carbon atoms in the molecule which comprises a vertical feed bin having arranged within its lower end a horizontally rotatable leveling means, at least one variable speed-driven screw conveyor arranged in said bin under said leveling means, a first elongated vertical vessel provided with first conduit means in its lower end for introducing heated gasiform fluidizing medium, first separation means connecting into the upper end of said first vessel having a sealed conduit depending therefrom into said first vessel for introducing solid polymer into said first vessel, a conduit connecting into said separation means for withdrawing gasiform fluidizing medium, an elongated transfer conduit fluidly connecting said screw conveyor and said separation means, inlet means for introducing heated gasiform fluidizing medium into said transfer conduit, second conduit means connecting into the upper end of said first vessel for withdrawing gasiform fluidizing means therefrom, a second elongated vertical vessel, third conduit means for withdrawing solid polymer of reduced solvent content from said first vessel and connected to said second vessel for introducing solid polymer into said second vessel means for introducing heated inert gasiform fluidizing medium into said second vessel at a plurality of vertically spaced-apart points, vertically spaced-apart contacting means in the lower portion of said second vessel adjacent but spaced vertically from said means for introducing inert gasiform fluidizing medium for contacting said solid polymer therewith, second separation means connecting into the upper end of said second vessel having a sealed conduit depending therefrom into said second vessel for discharging solid polymer into said second vessel, a discharge conduit connecting said second separation means with the upper end of said second vessel for introducing suspended solid polymer into said second separation means, and means for withdrawing solid polymer substantially free of solvent from the lower end of said second vessel.

2. Apparatus for processing a wet, nonaqueous solvent-containing solid polymer of an alpha olefin having 2 to 8 carbon atoms in the molecule which comprises a vertical feed bin having arranged within its lower end a horizontally rotatable leveling means, at least one screw conveyor arranged in said bin under said leveling means, a variable speed means for driving said screw conveyor, a first elongated vertical vessel provided with first conduit means in its lower end for introducing heated gasiform fluidizing medium, first separation means connecting into the upper end of said first vessel having a sealed conduit depending therefrom into said first vessel for introducing solid polymer into said first vessel, an outlet conduit connecting into said separation means for withdrawing gasiform fluidizing medium, means connected to said outlet conduit for sensing the temperature in said outlet conduit, means connecting said temperature sensing means and said variable speed driving means providing a signal responsive to said temperature for controlling the speed of said variable speed driving means, an elongated transfer conduit fluidly connecting said screw conveyor and said separation means, inlet means for introducing heated gasiform fluidizing medium into said transfer conduit, second conduit means connecting into the upper end of said first vessel for withdrawing gasiform fluidizing means therefrom and connecting into said transfer conduit downstream from said inlet means, a second elongated vertical vessel, third conduit means for withdrawing solid polymer of reduced solvent content from said first vessel and connected to said second vessel for introducing solid polymer into said second vessel, means for introducing heated inert gasiform fluidizing medium into said second vessel at a plurality of vertically spaced-apart points, vertically spaced-apart contacting means in the lower portion of said second vessel adjacent but spaced vertically from said means for introducing inert gasiform fluidizing medium for contacting said solid polymer therewith, second separation means connecting into the upper end of said second vessel having a sealed conduit depending therefrom into said second vessel for discharging solid polymer into said second vessel, a discharge conduit connecting said second separation means with the upper end of said second vessel for introducing suspended solid polymer into said second separation means, and means for withdrawing solid polymer substantially free of solvent from the lower end of said second vessel.

3. Apparatus for processing a wet, nonaqueous solvent-containing solid polymer of an alpha olefin having 2 to 8 carbon atoms in the molecule which comprises a vertical feed bin having arranged within its lower end a horizontally rotatable leveling means, at least one variable speed-driven screw conveyor arranged in said bin under said leveling means, a first elongated vertical vessel provided with first conduit means in its lower end for introducing heated gasiform fluidizing medium, first separation means connecting into the upper end of said first vessel having a sealed conduit depending therefrom into said first vessel for introducing solid polymer into said first vessel, a conduit connecting into said separation means for withdrawing gasiform fluidizing medium, an elongated transfer conduit fluidly connecting said screw conveyor and said separation means, inlet means for introducing heated gasiform fluidizing medium into said transfer conduit, second conduit means connecting into the upper end of said first vessel for withdrawing gasiform fluidizing means therefrom, an upwardly open conical, foraminous grid in the lower portion of said first vessel forming an outlet therefor, a second elongated vertical vessel, third conduit means connected to said outlet for said first vessel for withdrawing solid polymer of reduced solvent content from said first vessel and connected to said second vessel for introducing solid polymer into said second vessel, means for introducing heated inert gasiform fluidizing medium into said second vessel at a plurality of vertically spaced-apart points, vertically spaced-apart contacting means in the lower portion of said second vessel adjacent but spaced vertically from said means for introducing inert gasiform fluidizing medium for contacting said solid polymer therewith, second separation means connecting into the upper end of said second vessel having a sealed conduit depending therefrom into said second vessel for discharging solid polymer into said second vessel, a discharge conduit connecting said second separation means with the upper end of said second vessel for introducing suspended solid polymer into said second separation means, and means for withdrawing solid polymer substantially free of solvent from the lower end of said second vessel.

4. Apparatus in accordance with claim 3 in which the conical grid terminates in a thermally insulated conduit discharging through the lower end of said first vessel.

5. Apparatus for processing a wet, nonaqueous solvent-containing solid polymer of an alpha olefin having 2 to 8 carbon atoms in the molecule which comprises a vertical feed bin having arranged within its lower end a horizontally rotatable leveling means, at least one variable speed-driven screw conveyor arranged in said bin under said leveling means, a first elongated vertical vessel provided with first conduit means in its lower end for introducing heated gasiform fluidizing medium, first separation means connecting into the upper end of said first vessel having a sealed conduit depending therefrom into said first vessel for introducing solid polymer into said first vessel, a conduit connecting into said separation means for withdrawing gasiform fluidizing medium, an elongated transfer conduit fluidly connecting said screw conveyor and said separation means, inlet means for introducing heated gasiform fluidizing medium into said transfer conduit, second conduit means connecting into the upper end of said first vessel for withdrawing gasiform fluidizing means therefrom and connecting into said transfer conduit, a second elongated vertical vessel, third conduit means for withdrawing solid polymer of reduced solvent content from said first vessel and connected to said second vessel for introducing solid polymer into said second vessel, means for introducing heated inert gasiform fluidizing medium into said second vessel at a plurality of vertically spaced-apart points, vertically spaced-apart baffle contacting means in the lower portion of said second vessel adjacent but spaced vertically from said means for introducing inert gasiform fluidizing medium for contacting said solid polymer therewith, second separation means connecting into the upper end of said second vessel having a sealed conduit depending therefrom into said second vessel for discharging solid polymer into said second vessel, a discharge conduit connecting said second separation means with the upper end of said second vessel for introducing suspended solid polymer into said second separation means, and means for withdrawing solid polymer substantially free of solvent from the lower end of said second vessel.

6. Apparatus for processing a wet, nonaqueous solvent-containing solid polymer of an alpha olefin having 2 to 8 carbon atoms in the molecule which comprises a vertical feed bin having arranged within its lower end a horizontally rotatable leveling means, at least one variable speed-driven screw conveyor arranged in said bin under said leveling means, a first elongated vertical vessel provided with first conduit means in its lower end for introducing heated gasiform fluidizing medium, first separation means connecting into the upper end of said first vessel having a sealed conduit depending therefrom into said first vessel for introducing solid polymer into said first vessel, a condenser-scrubber means for recovering solvent, a conduit connecting into said first separation means for withdrawing gasiform fluidizing medium from said first separation means and fluidly connecting to said condenser-scrubber means, an elongated transfer conduit fluidly connecting said screw conveyor and said separation means, inlet means fluidly connecting said condenser-scrubber means and said transfer conduit for introducing heated gasiform fluidizing medium withdrawn from said condenser-scrubber means into said transfer conduit, said inlet means comprising a blower and heating means, second conduit means connecting into the upper end of said first vessel for withdrawing gasiform fluidizing means therefrom and connecting into said transfer conduit, a second elongated vertical vessel, third conduit means for withdrawing solid polymer of reduced solvent content from said first vessel and connected to said second vessel for introducing solid polymer into said second vessel, means for introducing heated inert gasiform fluidizing medium into said second vessel at a plurality of vertically spaced-apart points, vertically spaced-apart contacting means in the lower portion of said second vessel adjacent but spaced vertically from said means for introducing inert gasiform fluidizing medium for contacting said solid polymer therewith, second separaton means connecting into the upper end of said second vessel having a sealed conduit depending therefrom into said second vessel for discharging solid polymer into said second vessel, a discharge conduit connecting said second separation means with the upper end of said second vessel for introducing suspended solid polymer into said second separation means, and means for withdrawing solid polymer substantially free of solvent from the lower end of said second vessel.

No references cited.

WILLIAM F. O'DEA, *Acting Primary Examiner.*